United States Patent

Kiselev et al.

[15] 3,648,475
[45] Mar. 14, 1972

[54] APPARATUS FOR FREEZING NUCLEUS-CONTAINING CELLS AND OTHER BIOLOGICAL MATERIALS

[72] Inventors: Anatoly Efimovich Kiselev, ulitsa Kostyakova, 8/6, kv. 182, Moscow; Nadar Nikolaevich Mgebrishvili, prospekt Chavchavadze 12; Marlen Mikhailovich Rokva, prospekt Vazha Pshavela, IV kvartal, korpus 24, kv. 22; Iosif Konstantinovich Makhatadze, Digomshy massiv, IV kvartal, korpus 8, kv. 34; Shalva Viktorovich Kakhiani, ulitsa Barnova, 126; Sergei Ivanovich Oganov, prospekt Vazha Pshavela, II kvartal, korpus 32, kv. 18; Georgy Valeryanovich Bakuradze, prospekt Chavchavadze 22, kv. 65; Petz Mikhailovich Badalov, prospekt Vazha Pshavela, IV kvartal, korpus II, kv. 28, Tbilisi, all of U.S.S.R.

[22] Filed: July 29, 1969

[21] Appl. No.: 845,775

[30] Foreign Application Priority Data

Dec. 31, 1968  U.S.S.R. ..............................1293405

[52] U.S. Cl. ....................................62/126, 62/157, 62/231, 62/514, 236/46, 250/202
[51] Int. Cl. .....................................................F25b 49/00
[58] Field of Search................62/49, 50, 126, 231, 514, 157; 236/46, 46 A; 250/202; 137/596, 625

[56] References Cited

UNITED STATES PATENTS

| | | | |
|---|---|---|---|
| 1,976,298 | 10/1934 | Richter | 250/202 X |
| 3,080,725 | 3/1963 | Cowley et al. | 62/50 X |
| 3,092,974 | 6/1963 | Haumann et al. | 62/50 X |
| 3,346,718 | 10/1967 | Cooley et al. | 62/50 X |

OTHER PUBLICATIONS

Linde BF-4 Biological Freezing System, A Brochure No. F2002A From Union Carbide. Published in December 1966.

*Primary Examiner*—William F. O'Dea
*Assistant Examiner*—P. D. Ferguson
*Attorney*—Holman & Stern

[57] ABSTRACT

An apparatus for freezing nucleus-containing cells and other biological materials comprising a refrigerant vessel connected to a freezing chamber and furnished with a forced-feed system for refrigerant delivery to the freezing chamber. In the apparatus, provision is made for a regulator coupled to a temperature transmitter, which is disposed in the freezing chamber, and also to the refrigerant forced-feed system.

The apparatus makes it possible to completely automate the entire freezing process and further permits the programming of freezing processes to be made without accounting for the critical temperature range in which there occurs maximum deterioration of nucleus-containing cells. The apparatus provides for the optimum freezing rate while the biological materials being frozen traverse the critical temperature zone.

3 Claims, 2 Drawing Figures

Patented March 14, 1972     3,648,475

APPARATUS FOR FREEZING NUCLEUS-CONTAINING CELLS AND OTHER BIOLOGICAL MATERIALS

This invention relates to medical equipment and, more particularly, to apparatus for freezing biological materials, such as blood, marrow, tissues, isolated organs, etc., at temperatures down to −196° C. The present invention may be employed to advantage in agriculture for freezing animal semen to be used for artificial insemination.

Known in the art are arrangements for freezing blood, marrow and other biological materials comprising a freezing chamber and a refrigerant vessel, provision being made in said arrangements for a refrigerant forced-feed system to cool the freezing chamber which accommodates a temperature sensing element coupled to a recorder. In the known arrangements, the mode of freezing temperature variations is programmed by means of a template or by prescribing the sequence in which appropriate switches should be manipulated by the operator.

The operation of the known arrangements presents difficulties, insofar as continuous control during the entire freezing process should be exercised by the operator who must have at his disposal data pertaining to the critical temperature range (zone) characterized by maximum deterioration of nucleus-containing cells and other biological materials. To ensure optimum conditions while the biological materials being frozen traverse the critical temperature zone, i.e. to provide for maximum freezing rate consistent with the type of the biological material being handled, the operator manipulates appropriate switches. Moreover, the known arrangements are incapable of recording the temperature of the biological material being frozen, but indicate the temperature in the freezing chamber, which temperature characterizes but in an indirect manner the true temperature of the biological material being frozen. The aforesaid disadvantage of the prior art arrangements restricts the employment of said arrangements exclusively to freezing biological materials having predetermined temperature parameters, so as to enable the operator to assess the temperature of the biological material being frozen from the recorded temperature in the freezing chamber and also to determine beforehand the freezing chamber temperatures which correspond to the commencement and termination of the critical temperature zone in the biological material in question. A further disadvantage of the known arrangements manifests itself in the fact that they do not provide the possibility of revealing the errors made by the operator in the program (determination of the commencement and termination points of the critical temperature zone for the biological material to be frozen) and reproduce the programmed freezing process with the errors inherent therein. A still further disadvantage of the known arrangements is that the consumption of refrigerant per freezing cycle is relatively significant and the arrangements are expensive.

It is an object of the present invention to provide an apparatus for freezing nucleus-containing cells and other biological materials which will be capable of determining the commencement of the critical temperature zone, of switching over the freezing rate from the programmed value to the optimum value during the entire dwell time of the biological material being frozen in the critical temperature zone and of resetting the freezing rate back to the programmed value at the end of said zone, of determining the terminal point of the critical temperature zone, of allowing the operator to program the freezing process without accounting for the critical temperature range, of displaying the commencement and termination points of the critical temperature zone, and of effecting the freezing process in compliance with the program, thereby making it possible to relieve the operator from watching continually the apparatus performance during the entire process of freezing an the biological materials, to reduce substantially the consumption of refrigerant, and to minimize the cost price of the apparatus.

In accordance with this and other objects, the present invention consists in an apparatus for freezing nucleus-containing cells and other biological materials comprising a refrigerant vessel connected by means of a pipeline to a freezing chamber and furnished with a forced-feed system for supplying the refrigerant to the freezing chamber accommodating a temperature transmitter coupled to a recorder, wherein, according to the invention, provision is made for a comparator whose inputs are coupled to the temperature transmitter, and a programmer while the output is coupled to the refrigerant forced-feed system.

It is preferable to employ in the comparator a four-arm bridge built up by two parallel connected slide wires with a phase-sensitive amplifier connected across the movable contacts of said slide wires and coupled to the refrigerant forced-feed system, provision being made to mechanically link the movable contact of one slide wire to a programmer mechanism and to couple the movable contact of the other slide wire to the measuring mechanism (active part) of a recorder.

In the preferred embodiment, the programmer consists of a photoelectric follower incorporating a tape drive, a tape-programmed freezing curve, and a photoelectric cell mechanically linked to the movable contact of the slide wire, movable contact travel being controlled by photoelectric cell signals.

It is further expedient to provide in the pipeline that connects the refrigerant vessel with the freezing chamber a valve linked to the comparator, said valve being intended to prevent refrigerant penetration into the freezing chamber when the refrigerant forced-feed system is disconnected.

The refrigerant vessel should preferably contain a refrigerant reference level gauge hooked into the power circuit of the refrigerant forced-feed system.

It is likewise advantageous to dispose the temperature transmitter in the container accommodating the biological material being frozen, said container being placed in the freezing chamber.

The present invention is illustrated hereinbelow by the description of an exemplary embodiment thereof to be taken in conjunction with the accompanying drawings, in which.

Figure 1:
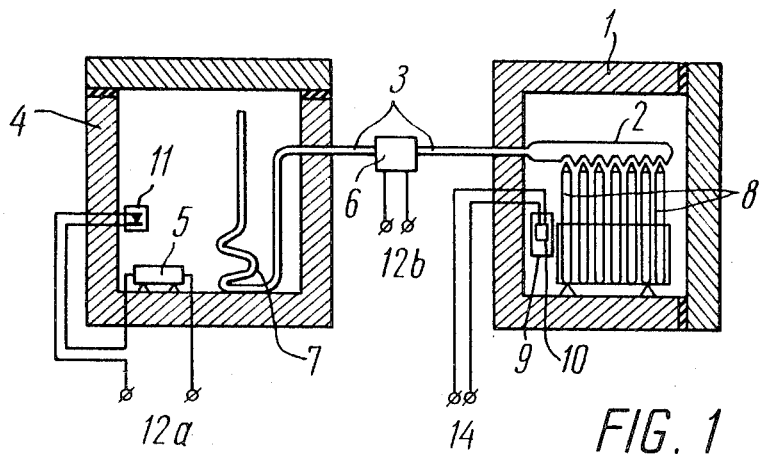
FIG. 1 is a schematic diagram of the refrigerant vessel, e.g., a vessel containing liquid nitrogen, with the forced-feed system for refrigerant delivery into the freezing chamber, and also the freezing chamber with biological material containers disposed therein, according to the invention.

The present apparatus incorporates freezing chamber 1 (FIG. 1), which accommodates refrigerant distributor 2 connected by pipeline 3 to refrigerant vessel 4. Disposed on the bottom of vessel 4 is forced-feed system 5, e.g., a heater for supplying the refrigerant to freezing chamber 1. In pipeline 3, provision is made for valve 6 intended for discharging into ambient atmosphere excess refrigerant from vessel 4 after refrigerant forced-feed system 5 has been cut off. The section of pipe line 3 that protrudes into refrigerant vessel 4 and is disposed therein beneath the minimum requisite level of the refrigerant consists of coil 7, the free end of said coil being located above the maximum refrigerant level in vessel 4. Containers with the biological material to be frozen are placed into freezing chamber 1, which also contains reference container 9 with temperature transmitter 10 disposed thereinside.

Figure 2:
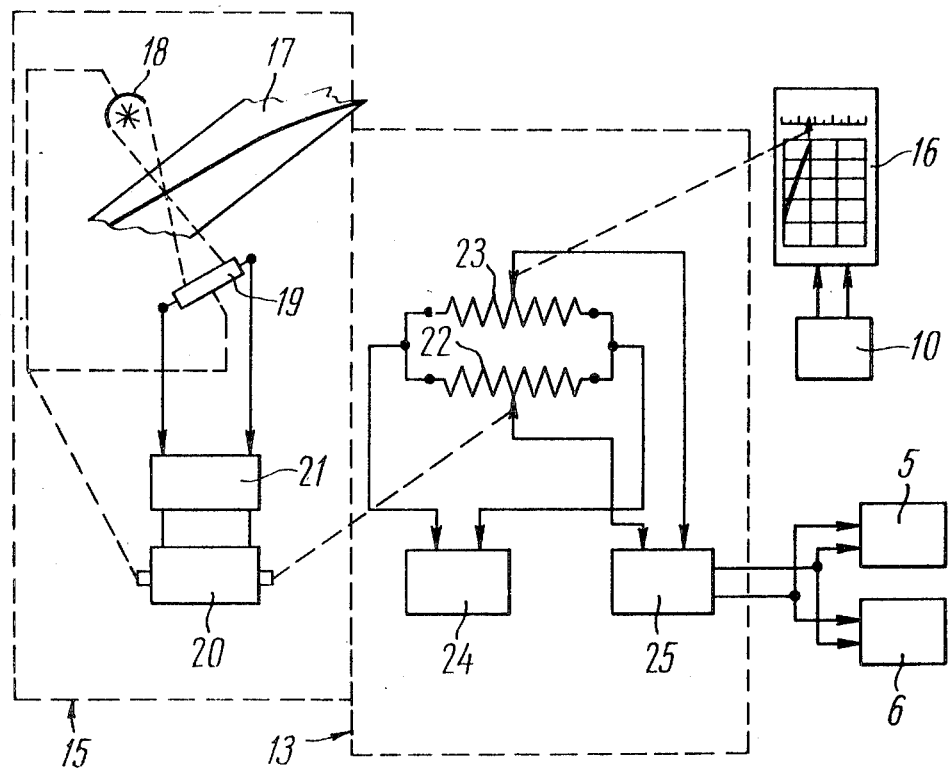
FIG. 2 is a block-diagram of the apparatus for freezing nucleus-containing cells and other biological materials, according to the invention.

Refrigerant vessel 4 accommodates refrigerant reference (minimum) level gauge 11, which cuts off the power supply of refrigerant forced-feed system 5 once the refrigerant level in vessel 4 falls below the minimum level, the supply of the refrigerant to freezing chamber 1 being discontinued in order to retain coil 7 submerged in the refrigerant, prevent the heating of freezing chamber 1, and avoid apparatus breakage. A comparator means 13 (FIG. 2) sends to terminals 12a and 12b a signal, which controls the functioning of refrigerant forced-feed system 5 and valve 6, while temperature transmitter 10 sends a signal via terminals 14 (FIG. 1) to the input of temperature and freezing rate regulator 13 (FIG. 2).

The present apparatus also includes programmer 15 and recorder 16. Elements 13, 15, and 16 define a temperature and freezing rate regulator.

Programmer 15 consists of tape 17 with the programmed freezing curve marked thereon, illuminator 18, photoelectric cell 19, motor 20, which controls the travel of illuminator 18 and photoelectric cell 19 along the tape-programmed curve. To vary the direction of rotation of motor 20, use is made of unit 21, which is coupled to photoelectric cell 19 and functions so that said cell travels in one direction when completely blacked out, the direction of travel being reversed when said cell is illuminated.

Comparator 13 includes slide wires 22 and 23 and movable contacts connected in parallel and forming a four-arm bridge as well as elements 24 and 25 to be discussed hereinbelow. The shaft of motor 20 is mechanically linked to the movable contact of slide wire 22, while the movable contact of slide wire 23 is mechanically linked to the measuring mechanism (active part) of recorder 16. A source of current provided by unit 24 is connected to one of the diagonals of the bridge, while the other diagonal of this bridge across the movable contacts of slide wires 22 and 23 feeds a signal to the input of phase-sensitive amplifier 25. The output of phase-sensitive amplifier is connected to refrigerant forced-feed system 5 and valve 6.

The apparatus of the invention functions as follows.

Containers 8 (FIG. 1) with the biological material to be frozen are placed in freezing chamber 1, which also accommodates reference container 9, a small amount of the biological material to be frozen (or of any suitable substitute) being preliminarily introduced into said reference container. Refrigerant (nitrogen vapor) is introduced into vessel 4, and refrigerant forced-feed system 4 and valve 6 are coupled via terminals 12a and 12b to the output of regulator 13 (FIG. 2) and also to the output of phase-sensitive amplifier 25 of regulator 13. Temperature transmitter 10 disposed in reference container 9 and intended to indicate the temperature of the biological product being frozen sends an appropriate signal via terminals 14 (FIG. 1) to the inputs of regulator 13 and recorder 16.

Programmer 15 (FIG. 2) contains tape 17 with the programmed freezing curve marked thereon.

Upon apparatus energization, there commences the travel of tape 17, and motor 20 causes photoelectric cell 19 with illuminator 18 to travel, say, rightwardly, the movable contact of slide wire 22, which is mechanically linked to motor 20 of programmer 15, being simultaneously driven.

Hence, the bridge built up by slide wires 22 and 23 will be unbalanced and the resultant unbalance signal fed to the input of phase-sensitive amplifier 25 will actuate refrigerant forced-feed system 5. The unbalance signal is likewise fed to valve 6, which allows the refrigerant (nitrogen vapor) to flow via pipeline 3 (FIG. 1) into freezing chamber 1. In freezing chamber 1, the refrigerant is atomized by distributor 2 and there commences the process of freezing containers 8 with the biological material placed therein. In order to enhance the heat transfer between the refrigerant and containers 8, the temperature of the refrigerant in pipeline 3 should be maintained as close as possible to the temperature of the refrigerant in vessel 4. This goal is attained by feeding the refrigerant to pipeline 3 via coil 7, which is constantly submerked in the refrigerant.

In reference container 9, which accommodates the biological material to be frozen or a substitute thereof, the process of heat transfer is analogous to that occuring between the refrigerant and principal containers 8, insofar as containers 8 and reference container 9 are made from identical materials, the wall thickness and the distance between walls in the containers in question being also identical. Under these conditions, the process of freezing, and, hence, the temperature of the biological material in reference container 9 will be similar to those incontainers 8. Recorder 16 (FIG. 2) records the temperature in reference container 9 (1), which is identical to the temperature of the biological material being frozen in containers 8.

The active part of recorder 16 (FIG. 2) is caused, in the same manner as is photoelectric cell 19, to travel rightwardly and entrains therewith the movable contact of slide wire 23.

Refrigerant feed to freezing chamber 1 proceeds until the temperature of the biological material being frozen equals the tape-programmed temperature.

The bridge comprised of slide wires 22 and 23 will be balanced when the movable contact of slide wire 23 is displaced to a position corresponding to that of the movable contact of slide wire 22, so that a zero signal is fed to the input of phase-sensitive amplifier 25, thereby disconnecting refrigerant forced-feed system 5 and concomitantly cutting off valve 6, which action discontinues refrigerant flow via pipeline 3 (FIG. 1) to freezing chamber 1 and prevents biological material freezing to a temperature below the programmed value. In the off-position, valve 6 opens a port for discharging the refrigerant into the ambient atmosphere.

Where the amount of the refrigerant in vessel 4 diminishes in the course of the experiment so much that coil 7 becomes exposed, refrigerant minimum level gauge 11 will cut off forced-feed system 5, which supplies the refrigerant from vessel 4 to freezing chamber 1, appropriate light and sound alarms (not shown in figures) being simultaneously actuated.

The advantages of the present invention consist in that the entire freezing process is totally automated and the role of the operator is restricted to placing containers 8 with the biological material to be frozen in freezing chamber 1, charging said biological material or a substitute thereof into reference container 9, introducing programmed tape 17 into programmer 15, and switching on the source of power supply.

In programming the freezing process, the operator requires no data on the critical temperature range and may even disregard altogether the critical temperature zone. Where the program of freezing a specific biological materials has been selected erroneously, the present apparatus will reveal the errors inherent in the program, thereby providing the possibility of avoiding such errors in subsequent programming.

If the actual temperature of the biological materials being frozen lags behind the programmed temperature, the present apparatus is capable of eliminating rapidly this temperature lag.

The apparatus ensures optimum freezing rate in the course of biological material passage through the critical temperature zone, the optimum freezing rate for a specific biological material being pre-set by the operator who is in a position to alter this rate as desired in the course of experiments.

The present apparatus for freezing nucleus-containing cells and other biological materials provides for a moderate refrigerant consumption as compared to the known arrangements.

Insofar as the process of freezing is of short duration, excessive thermal insulation of the refrigerant vessel and freezing chamber can be dispensed with, and said units may be made from cheap insulating materials, such as foamed plastics, polyurethane foam, etc., whereby the cost price of the present apparatus is substantially reduced.

Depending upon specific applications, the present apparatus may be of the plant, semi-plant or laboratory type, the difference between various apparatus type being only in the capacity of refrigerant vessels and freezing chambers, since other units of the apparatus display reliable performance irrespective of the apparatus dimensions.

The present apparatus may be made detachable, in which case it is feasible to detach the refrigerant vessel and freezing chamber from the programmer and regulator, so that one programmer and regulator may be employed for controlling simultaneously the processes of freezing in a plurality of freezing chambers, another possibility offered by the detachable-type apparatus consisting in that the programmer with regulator may be installed in one room to control the operation of the freezing chamber and refrigerant vessel disposed outside said room.

In contrast to the known arrangements, the recorder provided in the present apparatus records the phenomena that occur directly in the biological material being frozen and not in the freezing chamber. It is further feasible to employ a recording instrument in order to display the dynamics of freezing processes.

Provision is made in the present apparatus for an appropriate switch which makes it possible to control the freezing processes manually.

We claim:

1. An apparatus for freezing nucleus-containing cells and other biological specimens comprising a freezing chamber; a refrigerant vessel connected to said freezing chamber by a pipeline; a force-feed system for the delivery of refrigerant from said refrigerant vessel to said freezing chamber; a temperature transmitter disposed inside said freezing chamber; a temperature and freezing rate regulator comprising a recorder having a measuring mechanism and having an input connected to the temperature transmitter, said recorder further having an output; a programmer means for setting a program for a freezing process including a program for selecting and maintaining absolute temperatures of the specimens and for selecting and maintaining desired freezing rates for the specimens, said programmer means generating signals representative of said programs at an output thereof; a comparator means having a plurality of inputs and an output, said comparator means comparing signals fed from said programmer means and from said recorder and for actuating said forced-feed system for the delivery of refrigerant in response thereto, one of the inputs of said comparator means being connected to the programmer means output, the other input of said comparator means being connected to the recorder output, and the comparator output being connected to the input of said forced-feed system for the delivery of refrigerant.

2. An apparatus as defined in claim 1, wherein the comparator means comprises two slide wires having movable contacts, said slide wires being connected in parallel and constituting a four-arm bridge; a phase-sensitive amplifier connected across said movable contacts of said slide wires, the output of said phase-sensitive amplifier being coupled to the input of said refrigerant forced-feed system; the movable contact of one of said slide wires being kinematically linked to said programmer means and the movable contact of the other slide wire being kinematically linked to the measuring mechanism of said recorder.

3. An apparatus as defined in claim 1, wherein the programmer means includes a photoelectric follower comprising a tape with a programmed temperature curve marked thereon, and a tape drive; a photoelectric cell mechanically linked to a movable contact of a slide wire associated with said comparator means a signal produced by said photoelectric cell controlling the travel of said movable contact.

* * * * *